United States Patent

Streib

[11] Patent Number: 6,109,028
[45] Date of Patent: Aug. 29, 2000

[54] METHOD OF CONTROLLING AN INTERNAL COMBUSTION ENGINE

[75] Inventor: Martin Streib, Vaihingen, Germany

[73] Assignee: Robert Bosch GmbH, Stuttgart, Germany

[21] Appl. No.: 08/970,812

[22] Filed: Nov. 14, 1997

[30] Foreign Application Priority Data

Nov. 14, 1996 [DE] Germany ............... 196 47 092

[51] Int. Cl.$^7$ ................... B60K 13/02; B60K 14/20; F02D 11/10
[52] U.S. Cl. ................... 60/397; 123/362; 477/203
[58] Field of Search ............... 60/397; 477/183, 477/203; 123/362, 339.14

[56] References Cited

U.S. PATENT DOCUMENTS

| 4,224,791 | 9/1980 | Ostwald | ............... 60/397 |
| 4,244,335 | 1/1981 | deRussy . | |
| 4,467,601 | 8/1984 | Watanabe . | |
| 5,184,463 | 2/1993 | Becker et al. . | |

FOREIGN PATENT DOCUMENTS 0072997  3/1983  European Pat. Off. .

*Primary Examiner*—F. Daniel Lopez
*Attorney, Agent, or Firm*—Walter Ottesen

[57] ABSTRACT

The invention relates to a method for controlling an internal combustion engine of a motor vehicle having an auxiliary force brake device wherein the auxiliary force is generated by coupling the brake actuation to the manifold pressure of the engine. In the method, the engine is operated with increased manifold pressure during the warm-up phase after a cold start. In the method, an actuation of the brake effects limiting the manifold pressure to a maximum value by intervening in the engine control. This maximum value is less than the value which would otherwise adjust under the same conditions without brake actuation.

8 Claims, 2 Drawing Sheets

METHOD OF CONTROLLING AN INTERNAL COMBUSTION ENGINE

FIELD OF THE INVENTION

The invention relates to a method for controlling an internal combustion engine of a motor vehicle in the warm-up phase after the engine is started.

BACKGROUND OF THE INVENTION

In modern vehicles equipped with a catalytic converter, the warm-up phase takes place at high intake manifold pressures and at high exhaust-gas temperatures. In order to warm up the catalytic converter as quickly as possible, the engine is driven with a greatly retarded injection angle for a cold start, that is, with poor engine efficiency. The desired heating operation on the catalytic converter results as a consequence of an increased exhaust-gas temperature. The poor engine efficiency is compensated by an increased throughput of the air/fuel mixture which is caused by driving to open the throttle flap or the idle adjusting element. In this way, and compared to normal idle or part-load operation, a significantly increased manifold pressure or a significantly reduced manifold pressure results. Catalytic converter warm-up functions of this kind are known, for example, from U.S. Pat. No. 5,184,463.

The above-described increase of the manifold pressure is further increased if, at the same time, a lean operation of the engine is desired. This leads to the problem that, under certain circumstances, an inadequate manifold pressure is available for the braking-force amplifier. Auxiliary-force braking units can operate with manifold underpressure as an energy store. These auxiliary-force braking units are widely used for passenger cars and for light-weight and medium-weight size commercial vehicles.

SUMMARY OF THE INVENTION

In view of the foregoing, it is an object of the invention to provide a method which optimizes the warm-up functions via the engine control and so ensures that the manifold underpressure, which is necessary for braking support, is available when required. It is also an object of the invention to provide an arrangement for carrying out the method of the invention.

The method of the invention is for controlling an internal combustion engine of a motor vehicle having a brake assembly including a brake force amplifier. The engine has an intake manifold wherein pressure can vary during operation of the engine and the brake assembly is equipped with an auxiliary brake force system wherein the auxiliary force is generated by coupling the brake force amplifier to the intake manifold pressure of the engine. The method includes the steps of: after a cold start, operating the engine in the warm-up phase at increased intake manifold pressure; and, effecting a reduction of the intake manifold pressure when the brake assembly is actuated by intervening in the control system of the engine.

The arrangement of the invention is for controlling an internal combustion engine of a motor vehicle having a brake assembly including a brake force amplifier. The engine has an intake manifold wherein manifold pressure can vary during operation of the engine and the brake assembly is equipped with an auxiliary brake force system wherein the auxiliary force is generated by coupling the brake force amplifier to the intake manifold pressure of the engine. The arrangement includes: an intake pipe connected to the intake manifold; at least one power adjusting element mounted in the intake pipe; an actuator operatively connected to the power adjusting element; a control apparatus functioning to drive the actuator and the power adjusting element to cause the engine to be driven with the manifold pressure increased during the warm-up phase of the engine after a cold start; means for coupling a signal indicative of an actuation of the brake assembly into the control apparatus; and, the control apparatus functioning to trigger an intervention into the control of the engine in response to the actuation of the brake assembly to thereby effect a reduction of the manifold pressure.

An essential feature of the invention is the intervention in the control of the engine when the brake is actuated so that the manifold pressure does not exceed a predetermined maximum value determined for the requirements of the braking function. In contrast, this limit is not effective in the remaining driving states. From the above, the advantage results that the braking underpressure is ensured when required and that the engine control in most driving states can be optimized with respect to lean operation or with respect to the catalytic-converter warm-up function. This is without having to take into account potential braking underpressure requirements.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
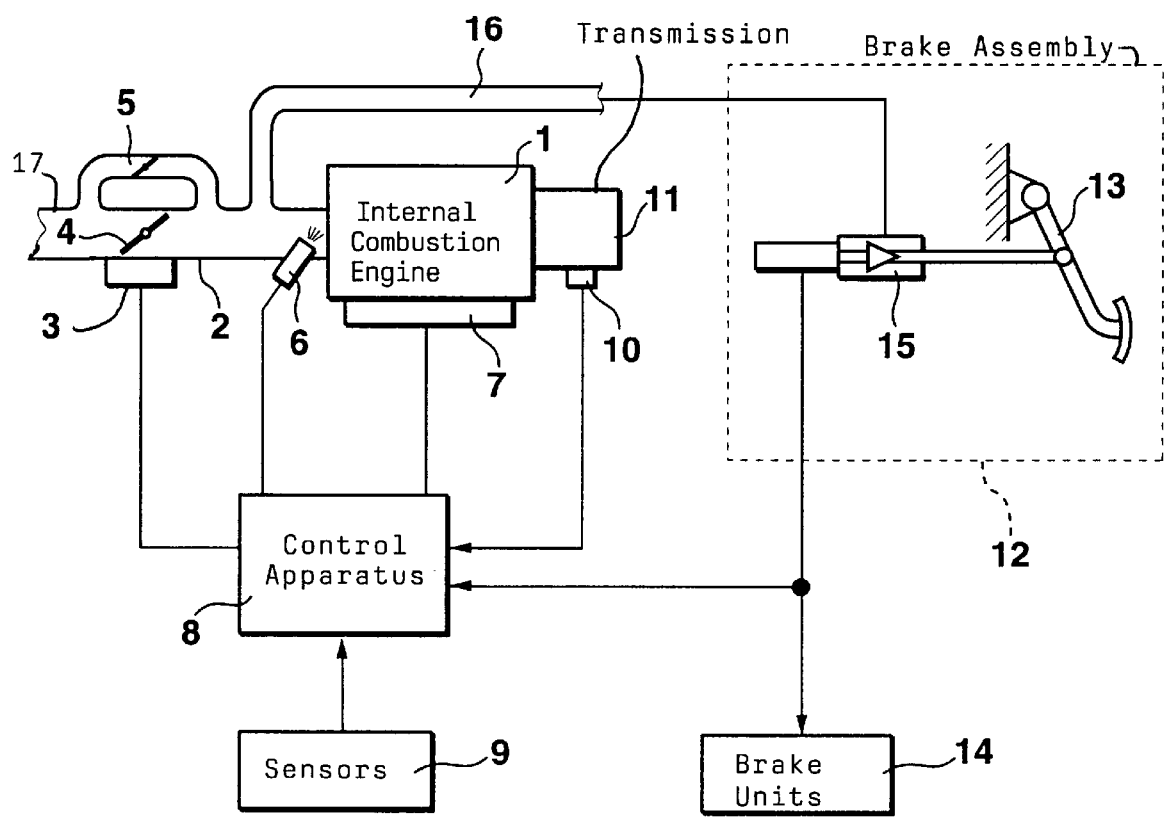
FIG. 1 is a schematic of the arrangement according to the invention presented in the context of the equipment with which it coacts; and, FIG. 2 is a flowchart of the method according to the invention.

Reference numeral 1 in FIG. 1 identifies the internal combustion engine which draws in air or an air/fuel mixture from the intake manifold 2 and combusts the same. The air flows via a power adjusting element into the intake manifold 2. The power adjusting element can, for example, include a throttle flap 4 adjustable in dependence upon driver command or an idle adjusting element 5 in a bypass relative to the throttle flap. The actuator means for the power adjusting elements is represented substantially by block 3. Fuel is injected into the intake manifold or directly into the combustion chambers of the engine via an injection valve system 6. The fuel is injected in correspondence to the quantity of the inducted air and the desired air/fuel ratio.

The combustion is triggered by an ignition device 7. A control apparatus 8 drives the power adjusting element via actuator means 3, the injection valve system 6 and the ignition device 7. The control apparatus 8 coordinates the engine control functions and, for this purpose, processes a series of input signals such as signals indicative of: engine rpm, engine temperature, angular position of the crankshaft, angular position of the camshaft, temperature of the inducted air, quantity of the inducted air, composition of the air/fuel mixture, et cetera.

In FIG. 1, the control apparatus 8 is supplied with a collective signal from block 9, which is representative of a selection of the above-mentioned signals, for all signals and, if required, for further signals, that is, the block 9 entitled "sensors" symbolizes the totality of the sensors required for providing the above-mentioned signals. In addition a road-speed signal from a transducer 10 on the transmission 11 as well as a brake-actuating signal from a brake assembly 12 are supplied to the control apparatus 8. The brake assembly 12 comprises a brake pedal 13 with which, for example, a hydraulic brake cylinder is actuated which, in turn, operates via a hydraulic system on the brake units 14. The brake pedal force is supplemented by an auxiliary force which is made available by a brake-force amplifier 15. This brake-force amplifier is coupled via a pipe line 16 to the intake manifold of the engine and is so configured that, when actuating the brake, the manifold underpressure operates on a membrane which is coupled to the brake pedal and so amplifies the pedal force.

This arrangement is used in the context of the invention as described below.

Underpressure for the brake-force amplifier is only then needed when it is actually intended to brake the vehicle and the vehicle is moving. For this reason, the following strategy is made possible.

A signal as to the brake actuation and as to the state of movement of the vehicle are supplied to the engine control apparatus. As long as the engine control apparatus recognizes that the brake is not actuated or that the vehicle is at standstill, no manifold underpressure is required for the brakes. Accordingly, in this operating state, no limitations must be effective for any functions increasing the manifold pressure. When, in contrast, the brake is actuated and the vehicle has a speed different from zero, then the air quantity or mixture quantity is reduced via a closing drive of the power adjusting element in the intake manifold 17 or at least limited to the extent that the maximum permissible manifold pressure, which is dimensioned for the requirements of the braking action, is not exceeded. If required, the ignition angle, shifted in the direction "retard", must be shifted for this time again in the direction "advance" in order to compensate for the expected torque drop caused by driving the power adjusting element. The brake-force amplifier has, as a rule, a certain storage effect. For this reason, it is under some circumstances possible to limit the manifold underpressure only a short time and to then again enable the same when the brake is actuated and the road speed is different from zero.

Figure 2:
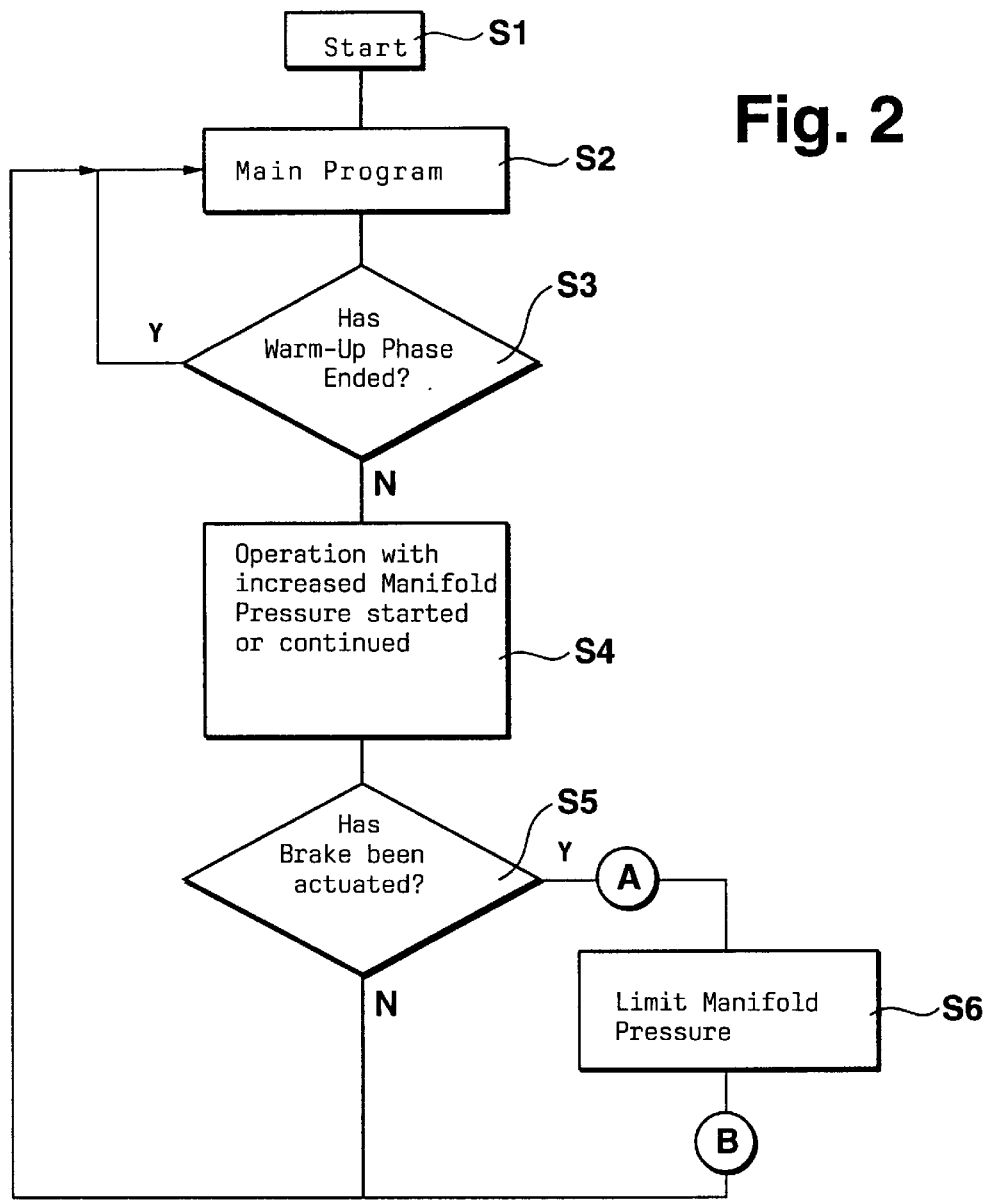
Figure 2:
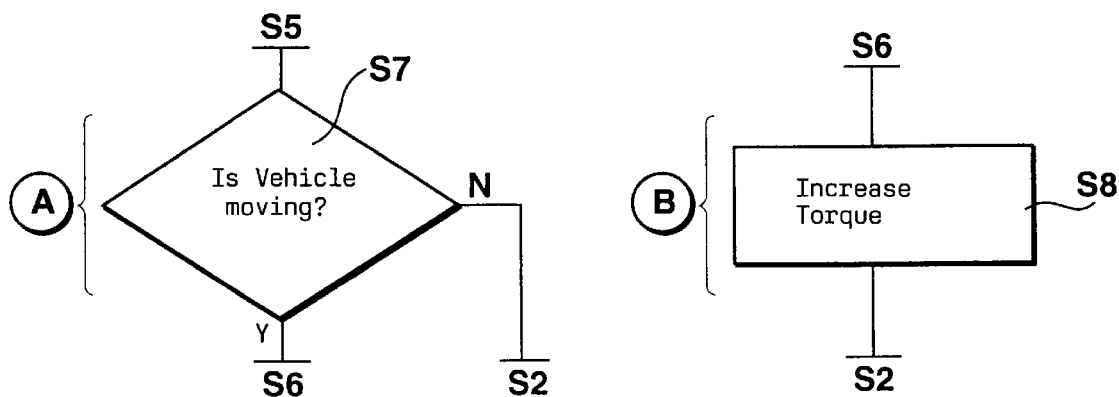

FIG. 2 shows this strategy in the context of a flowchart wherein the engine is started in step S1. Thereafter, in step S2, the main program for engine control is started, that is, especially for coordinating and controlling injection and ignition. In step S3, an inquiry is made as to whether the warm-up phase has already ended after the start. Criteria for this can be time threshold values, temperature threshold values or load and/or rpm values integrated since the start. If this step is answered in the negative, then the warm-up phase is not yet ended and the operation with increased manifold pressure is started in step S4 or, in the event that the operation has been started, it is continued.

In step S5, an inquiry is made as to whether the brake has been actuated. If this inquiry is answered in the negative, the loop from step S2 to S5 is repeated until the warm-up phase is terminated by answering step S3 in the affirmative or until step S5 is reached by actuation of the brake. In this case, the method continues with step S6 wherein the measures for dropping or limiting the manifold pressure are taken. The sequence from step S5 to step S6 can be supplemented by the inquiry in step S7 (mark A). This method variation provides for limiting the manifold pressure only when the vehicle actually moves.

A further variation of the method is provided by step S8 inserted at mark B. In this variation, the drop in torque, which is to be expected because of the intake pressure limitation, is compensated by an increase in torque, for example, by advancing the ignition.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine of a motor vehicle having a brake assembly including a brake force amplifier, the engine having an intake manifold wherein pressure varies during operation of the engine and the brake assembly being equipped with an auxiliary brake force system wherein the auxiliary force is generated by coupling said brake force amplifier to the intake manifold pressure of said engine, the method comprising the steps of:

after a cold start, operating said engine in the warm-up phase at increased intake manifold pressure and providing an increased throughout of the air/fuel mixture by driving one of the following to open to a first position: a throttle flap or an idle adjusting element; and, effecting a reduction of the intake manifold pressure when the brake assembly is actuated by effecting a drive of said throttle flap or said idle adjusting element to a second position wherein said throttle flap or said idle adjusting element remains open but less open than in said first position.

2. The method of claim 1, wherein the reduction of the intake manifold pressure is effected by limiting the intake manifold pressure to a maximum value which is less than the value of the intake manifold pressure would assume without an actuation of said brake assembly under otherwise same conditions.

3. The method of claim 2, effecting said reduction of the intake manifold pressure when the brake assembly is actuated only when said vehicle is moving.

4. The method of claim 3, said engine having an intake pipe connected to said intake manifold and having a power adjusting element mounted in said intake pipe; and, the method comprising the further step of increasing the intake manifold pressure by driving said power adjusting element to open.

5. The method of claim 4, wherein the ignition is retarded to increase the temperature of the exhaust gas and affects the torque of said engine; and, the quantity of the inducted air/fuel mixture, which increases because of the increase of intake manifold pressure, compensates the effect on said torque.

6. The method of claim 1, wherein said internal combustion engine is a spark-ignition engine having an ignition time point; and, a drop in engine torque, which is to be expected because of a drive of said power adjusting element in a direction of a reduced opening thereof, is compensated by a shift of the ignition time point which affects an increase of said engine torque.

7. An arrangement for controlling an internal combustion engine of a motor vehicle having a brake assembly including a brake force amplifier, the engine having an intake manifold wherein manifold pressure varies during operation of the engine and the brake assembly being equipped with an auxiliary brake force system wherein the auxiliary force is generated by coupling said brake force amplifier to the intake manifold pressure of said engine, the arrangement comprising:

a first throttle flap mounted in said intake manifold;

a bypass channel bypassing said throttle flap and a second throttle flap mounted in said bypass channel;

an actuator operatively connected to said second throttle flap;

a control apparatus functioning to drive said actuator and said second throttle flap to cause said engine to be driven with said manifold pressure increased during the warm-up phase of said engine after a cold start;

means for coupling a signal indicative of an actuation of said brake assembly into said control apparatus; and, said control apparatus functioning to trigger an intervention into the control of said engine in response to said signal by driving said actuator to cause said second throttle flap in said bypass to move in a direction to reduce the opening thereof but vet remain open.

8. The arrangement of claim 7, the arrangement further comprising sensor means for supplying a signal indicative of whether said motor vehicle is in motion or not; and, said control apparatus further functioning to trigger a reduction of said manifold pressure as a consequence of said actuation of said brake assembly only in the case of a movement of said vehicle.

* * * * *

UNITED STATES PATENT AND TRADEMARK OFFICE
CERTIFICATE OF CORRECTION

PATENT NO.    : 6,109,028
DATED         : August 29, 2000
INVENTOR(S)   : Martin Streib Page 1 of 1

It is certified that error appears in the above-identified patent and that said Letters Patent is hereby corrected as shown below:

<u>Column 2,</u>
Line 67, delete "addition" and substitute -- addition, -- therefor.

<u>Column 6,</u>
Line 3, delete "vet" and substitute -- yet -- therefor.

Signed and Sealed this

Twelfth Day of March, 2002

Attest:

Attesting Officer

JAMES E. ROGAN
*Director of the United States Patent and Trademark Office*